(12) United States Patent  
Chang

(10) Patent No.: US 6,570,627 B1  
(45) Date of Patent: May 27, 2003

(54) FLAT-TYPE MONITOR

(75) Inventor: Chun Soo Chang, Kyungsangbuk-Do (KR)

(73) Assignee: LG Electronics Inc., Seoul (KR)

( * ) Notice: Subject to any disclaimer, the term of this patent is extended or adjusted under 35 U.S.C. 154(b) by 382 days.

(21) Appl. No.: 09/679,638

(22) Filed: Oct. 5, 2000

(30) Foreign Application Priority Data

Oct. 8, 1999 (KR) .............................................. 99-43472

(51) Int. Cl.$^7$ ................................................. H04N 5/64
(52) U.S. Cl. ..................... 348/794; 348/836; 361/681; 361/683; 248/917; 248/919; 248/922
(58) Field of Search ................................ 348/794, 825, 348/836, 838, 843; 361/681, 683; 16/319, 333, 326; 248/917, 918, 919, 920–923, 121, 121.1, 274.1, 284.1, 291.1, 157; H04N 5/64

(56) References Cited

U.S. PATENT DOCUMENTS

| | | | | |
|---|---|---|---|---|
| 4,513,805 A | * | 4/1985 | Mase | 160/299 |
| 4,662,423 A | * | 5/1987 | Ishii | 160/293.1 |
| 4,681,279 A | * | 7/1987 | Nakamura | 242/381 |
| 4,770,279 A | * | 9/1988 | Shiozaki et al. | 192/45 |
| 5,109,571 A | * | 5/1992 | Oshima et al. | 16/334 |
| 5,436,792 A | * | 7/1995 | Leman et al. | 361/686 |
| 6,163,452 A | * | 12/2000 | O'Neal et al. | 361/681 |
| 6,256,837 B1 | * | 7/2001 | Lan et al. | 16/334 |
| 6,359,776 B2 | * | 3/2002 | Carlson | 361/683 |
| 6,378,830 B1 | * | 4/2002 | Lu | 248/278.1 |

* cited by examiner

Primary Examiner—Michael Lee  
(74) Attorney, Agent, or Firm—Fleshner & Kim, LLP

(57) ABSTRACT

A flat-type monitor to easily control a slant angle of an video display screen to a flat surface is disclosed. The present invention includes a flat video display unit having an video display screen, casings for containing and supporting the video display unit to expose the video display screen, and a slant controller for controlling a slant angle of an assembly of the video display unit and the casings corresponding to external force affecting on the assembly. The slant controller comprises a rotary shaft arranged in parallel to an installing flat surface for a monitor; a rotary member having containing holes to axially contain the rotary shaft and being coupled to a leg member installed on a rear side of the assembly to support the assembly to the installing flat surface; a rotary resistant member interposed between the rotary member and the rotary shaft to contact each other for adding resistance to the rotation of the rotary member relative to the rotary shaft; and a plurality of one-way clutch members arranged on at least one end for allowing the rotation of the rotary shaft toward a direction to which the leg member approaches to the assembly and for restraining the rotation of the rotary shaft toward a direction to which the leg member is parted from the assembly.

9 Claims, 5 Drawing Sheets

FLAT-TYPE MONITOR

BACKGROUND OF THE INVENTION

1. Field of the Invention

The present invention relates to a monitor, and more particularly to a flat-type monitor, which includes a flat video display unit, casings for containing and supporting the video display unit to expose the video display screen of the video display unit, and a slant controller for freely controlling a slant angle of assembly of the video display unit and the casings mounted to the unit to an installing surface.

2. Description of the Related Art

A general monitor using a cathode ray tube (CRT) includes a panel for an video display screen projecting a picture image, a funnel coupled on a rear side of the panel, and an electric gun on the rear end of the funnel. Accordingly, the general monitor has the drawbacks in dimensions, such as a thick monitor in total size, a huge casing in volume for surrounding the CRT and difficulty in handling due to its heavy weight.

Nowadays, regarding the drawbacks of the CRT monitor, a flat-type monitor is used for easy handling by adapting a flat-type liquid crystal displaying unit to reduce the thickness, volume and weight of the video display screen of the monitor. Generally, the flat-type monitor is used by connecting with a computer main body and a communication cable and slantingly supported it to a wall or a fixing unit.

However, the conventional flat-type monitor has an inconvenience, which is that a slant controller is not mounted for controlling a slant angle of the video display screen to the surface for installing the monitor.

SUMMARY OF THE INVENTION

An object of the present invention is to provide a flat-type monitor capable of easily controlling a slant angle of an video display screen to a flat surface for installing a monitor to position the video display screen for a user's eyes.

To achieve the object, the present invention provides a flat-type monitor including a flat video display unit having an video display screen, casings for containing and supporting the video display unit to expose the video display screen, and a slant controller for controlling a slant angle of an assembly of the video display unit and the casings corresponding to external force on the assembly. The slant controller comprises a rotary shaft arranged in parallel to an installing flat surface for a monitor; a rotary member having containing holes to axially contain the rotary shaft and being coupled to a leg member installed on a rear side of the assembly to support the assembly to the installing flat surface; a rotary resistant member interposed between the rotary member and the rotary shaft to contact with each other for adding resistance to the relative rotation of the rotary member to the rotary shaft; and a plurality of one-way clutch members arranged on at least one end for allowing the rotation of the rotary shaft toward a direction to which the leg member approaches to the assembly and for restraining the rotation of the rotary shaft toward a direction to which the leg member is parted from the assembly.

According to an embodiment of the present invention, the slant controller further comprises clutch housings to contain and support the one-way clutch members.

According to another embodiment of the present invention, the slant controller further comprises rotation limiting means for limiting the range of the rotation of the leg member.

According to another embodiment of the present invention, the rotation limiting means comprises at least one protrusion vertically extended to the rotary member, and an engaging step fixedly placed on a front side of the rotating direction of the protrusion for restraining the rotation of the protrusion.

According to another embodiment of the present invention, the rotary resistant member has a cylindrical body having a cut curved section projected radially on an end, and a containing section to contain the cut curved section is formed in the rotary member.

According to another embodiment of the present invention, the rotary resistant member rotates in unity with the rotary shaft by adding resistance to the rotation of the rotary shaft when the leg member rotates toward a direction of approaching the assembly, and the rotary resistant member rotates relative to the rotary shaft in a state of elastically contacting to the rotary shaft when the leg member rotates toward a direction of being parted from the assembly.

According to another embodiment of the present invention, the rotary member includes a coupling section on its outer surface, the coupling section vertically protruded so as to fixedly couple an end of the leg member.

According to another embodiment of the present invention, the leg member is formed as a unit with the rotary member of the slant controller.

BRIEF DESCRIPTION OF THE DRAWINGS

The above objects, other features and advantages of the present invention will become more apparent by the preferred embodiment described with reference to the accompanying drawings, in which.

DETAILED DESCRIPTION OF THE INVENTION

This invention will be described in further detail with reference to the accompanying drawings.

Figure 1:
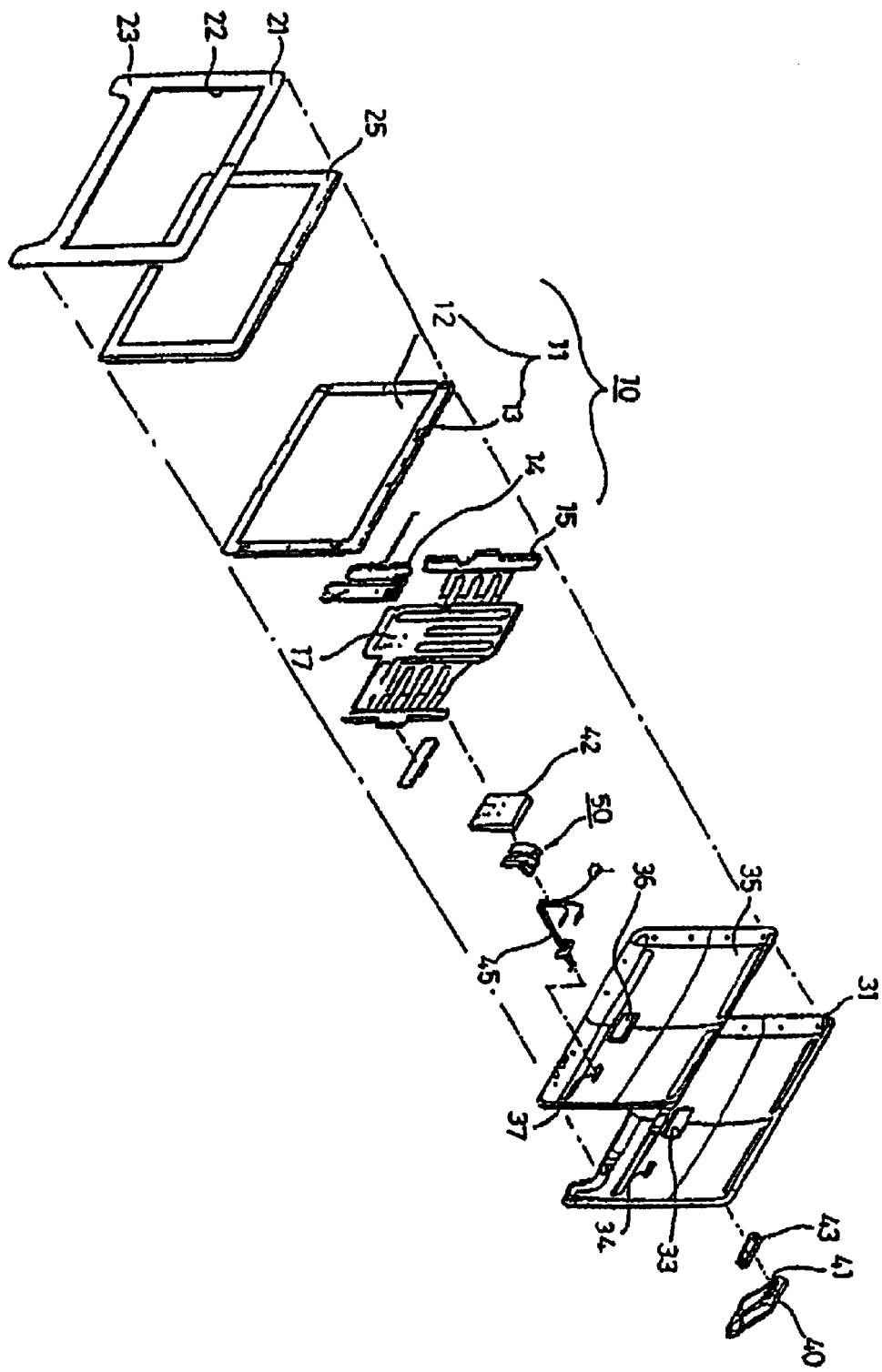
FIG. 1 is an exploded view of a flat-type monitor according to an embodiment of the present invention.

FIG. 1 is an exploded perspective view of a flat-type monitor according to an embodiment of the present invention. Referring to FIG. 1, the flat-type monitor includes a flat video display unit 10 using liquid crystal and so on; a front casing 21 and a rear casing 31 to be coupled with the video display unit 10 between them in such a way that an video display screen 12 of the video display unit 10 is exposed to the outside; a leg member 40 placed on a rear side of the rear casing 31 for slantingly supporting the rear casing 31 to an installing flat surface; and a slant controller 50 disposed between an assembly of the video display unit 10 and the casings, and the leg member 40 for controlling the slant to the installing flat surface of the video display screen 12.

The video display unit 10 includes an video display section 11 defining an video display screen 12, a plurality of circuit components 14, and a supporting frame 15 placed on a rear side of the video display section 11 and the circuit components 14. In the circumference of the video display screen 12, a plurality of penetrating holes 13 are formed to couple the front casing 21 and a plurality of coupling holes 17 are formed to couple the slant controller 50 in a lower portion of the supporting frame 15.

In the central portion of the front casing 21, an opening 22 to expose the video display screen 12 and a front leg section 23 projected vertically downward direction in both end portions of the lower portion thereof are individually formed.

The rear casing 31 forms containing space in which the video display unit is contained cooperatively with the front casing 21. In both end portions of the lower portion thereof, a rear leg section 32 is formed to have a fixing leg by cooperating with a front leg section 23. A front shielding plate 25 and a rear shielding plate 35 are respectively coupled to the insides of the front casing 21 and the rear casing 31 for shielding electronic waves. In the lower portion of the rear shielding plate 35 and the rear casing 31, respectively, penetrating holes 36 and 33 through which a part of the slant controller 50 is inserted, and cable holes 37 and 34 through which a plurality of connecting cables 45 are passed, are formed respectively.

Meanwhile, the slant controller 50 is coupled to the supporting frame 15 by interposing a reinforcing piece 42 between the slant controller 50 and the supporting frame 15. A cylindrical shaped cap member 43 is coupled to the exposed portion of the slant controller 50. A penetrating opening 44 is longitudinally formed on a circumferential surface of the cap member 43 to pass through a part of the slant controller 50. A leg member 40 is formed in the exposed area of the slant controller 50.

A leg member 40 has a substantially rectangular parallelepiped body whose both ends are rounded in lengthwise direction. A fastening section 41 is formed on an end of the leg member 40 for fastening to the slant controller 50 by a screw 46.

Figure 2:
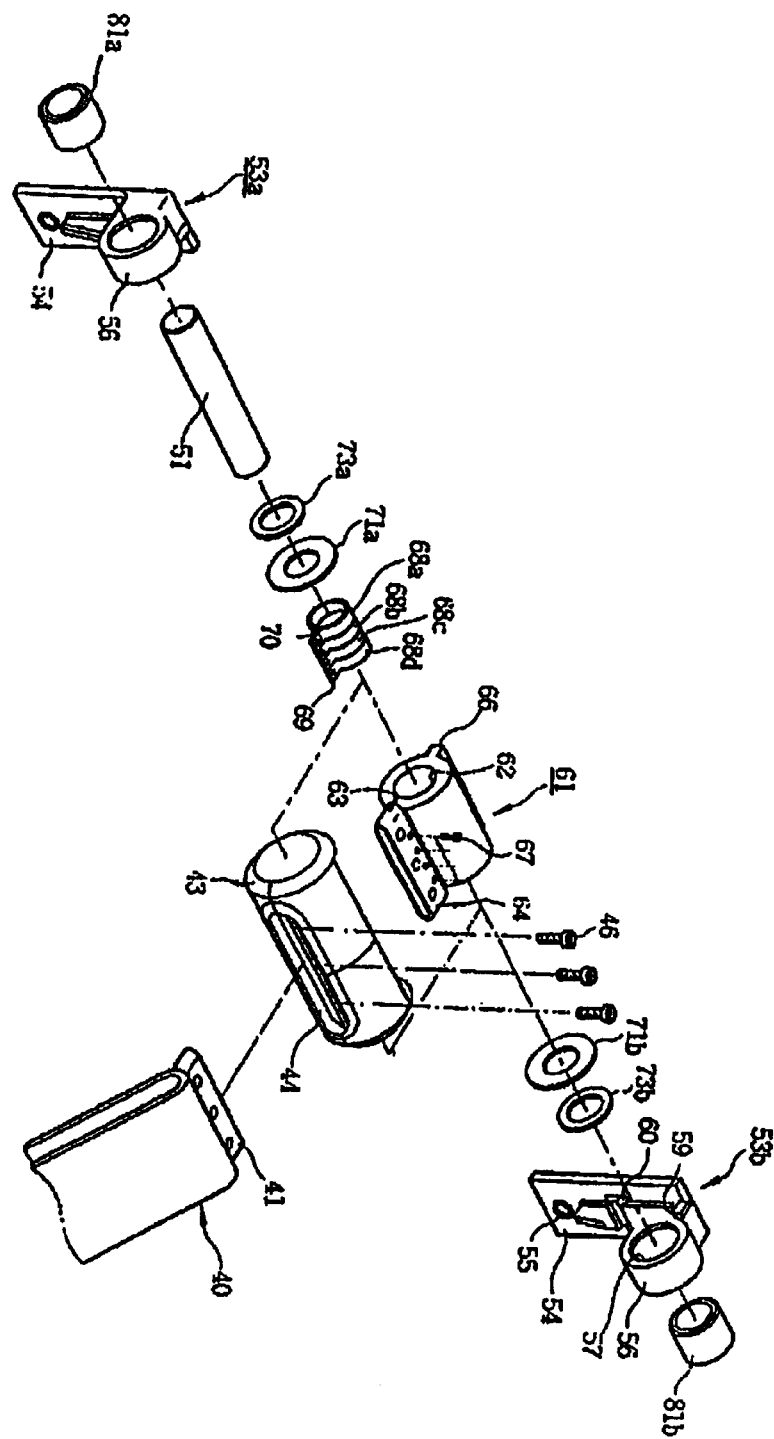
FIG. 2 is an exploded view of a slant controller shown in FIG. 1.
Figure 3:
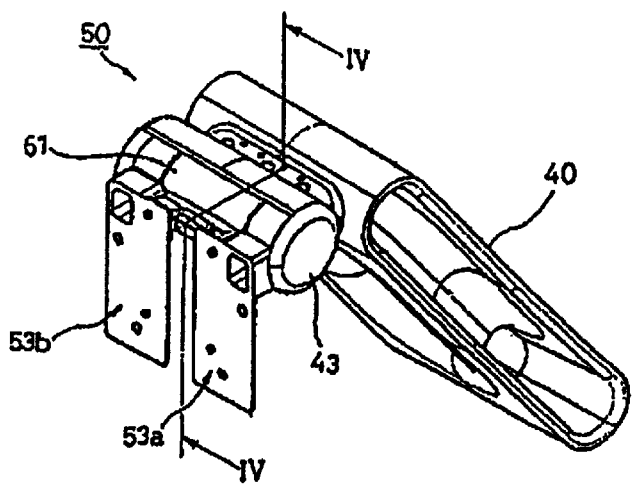
FIG. 3 is an enlarged perspective view showing an assembled state of the slant controller in FIG. 2.
Figure 4:
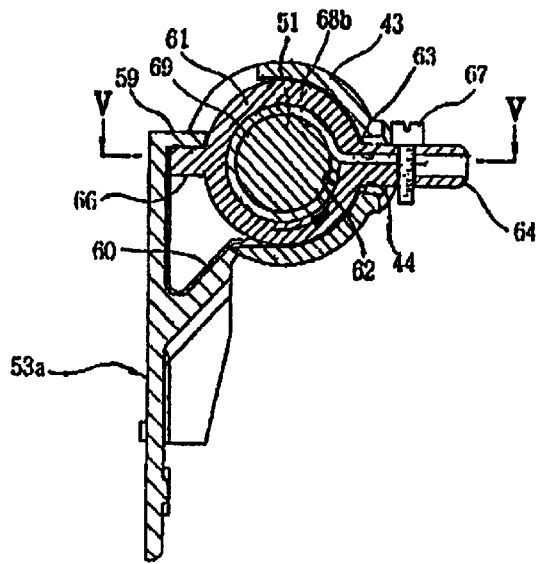
FIG. 4 is a cross-sectional view taken along the lines IV—IV of FIG. 3.
Figure 5:
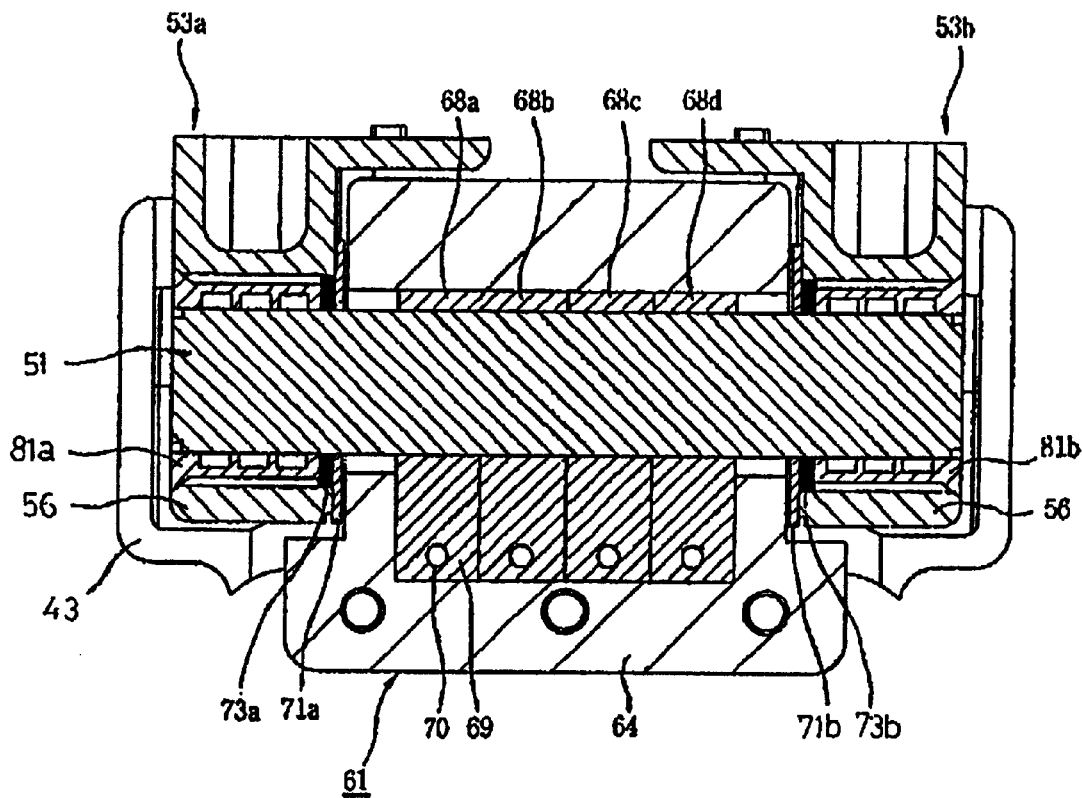
FIG. 5 is a cross-sectional view taken along the lines V—V of FIG. 4.
Figure 6:
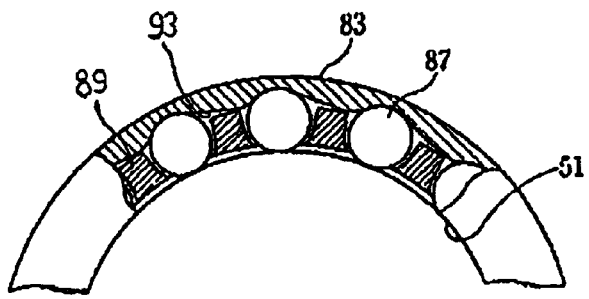
FIG. 6 is an enlarged cross-sectional view showing a part of a one-way clutch member shown in FIG. 3.

FIG. 2 is an exploded perspective view of a slant controller shown in FIG. 1. FIG. 3 is an enlarged perspective view showing an assembled state of the slant controller in FIG. 2. FIG. 4 is a cross-sectional view taken along the lines IV—IV in FIG. 3. FIG. 5 is a cross-sectional view taken along the lines V—V in FIG. 4. FIG. 6 is an enlarged cross-sectional view showing a part of one-way clutch members shown in FIG. 3. Referring to FIG. 2, the slant controller 50 includes a rotary shaft 51; a pair of clutch housings 53a and 53b placed on both ends of the rotary shaft 51 and fixed to couple to the supporting frame 15 shown in FIG. 1; a rotary member 61 placed between the clutch housings 53a and 53b and coupled to rotate relative to the rotary shaft 51; a plurality of rotary resistant members 68a, 68b, 68c and 68d having the shape of a disconnected cylinder, for adding resistance to the rotation of the rotary member 61 to the rotary shaft 51 and capable of rotating in unity with the rotary member 61 and elastically contacting to the rotary shaft 51; and one-way clutch members 81a and 81b contained in the clutch housings 53a and 53b for restraining the rotation of the rotary shaft 51, the clutch housings 53a and 53b being placed on both ends of the rotary shaft 51.

The clutch housings 53a and 53b, respectively include a plate-shaped coupling section 54 having a screw hole 55 to couple with the supporting frame 15, and a clutch containing section 56 parted from the plate surface of the coupling section 54 and having a containing hole 57 to contain the one-way clutch members 81a and 81b. As is best shown in FIG. 4, an upper engaging step 59 and a lower engaging step 60 are individually projected from the plate surface for limiting the rotating range of the rotary member 61 on an end of the coupling section 54.

Here, the upper engaging step 59 is formed to have 50 to 60 degrees of the slant angle of the video display screen 12 to the installing flat surface. The lower engaging step 60 should preferably have about 80 degrees of the slant angle of the video display screen to the installing flat surface supported by the leg member 40.

The rotary member 61 has a substantially cylindrical body on which a containing hole 62 is formed to contain the rotary resistant members 68a, 68b, 68c and 68d axially. Around the circumference, a coupling section 64 is protruded radially to couple the leg member. A containing hole 62 includes a recess section 63 depressed radially toward the coupling section 64. The coupling section 64 is exposed to the outside after passing through a penetrating hole 44 of the cap member 43 and inserted into the fastening section 41 of the leg member 40, then fixed each other by a screw 46. In the opposite side of the coupling section 64 about an axis thereof, a protrusion 66 is formed on the external surface to limit the rotating range of the rotary member 61 by contacting the upper engaging step 59 and the lower engaging step 60 respectively formed on the clutch housings 53a and 53b.

Referring to FIG. 5, the rotary resistant members 68a, 68b, 68c and 68d are formed of plate spring members to have disconnected cylindrical shapes on each end. Cut curved sections 69 are protruded radially on a part of the cut end of each rotary resistant member 68a, 68b, 68c and 68d. The cut curved sections 69 include screw holes 70 penetrated through the plate surface to be coupled to the rotary member 61 by the screw. The inner diameter surface of the rotary resistant members 68a, 68b, 68c and 68d is coupled to elastically contact the circumference of the rotary shaft 51, and the outer diameter surface thereof is contained in the containing hole 62 of the rotary member 61.

Since each rotary resistant member 68a, 68b, 68c and 68d is fixed by the screw after each cut curved section 69 being contained in the recess section 63, when the rotary member 61 is rotated upward about the rotary shaft 51, each rotary resistant member 68a, 68b, 68c and 68d is parted from the outer diameter surface of the rotary shaft 51 by applying force to a direction to which the cut curved section 69 is pulled to the outside, thereby, the friction with the rotary shaft 51 is decreased. On the contrary, if the rotary member 61 is rotated downward about the rotary shaft 51, the friction of each rotary resistant member 68a, 68b, 68c and 68d with the rotary shaft 51 is increased by applying force to a direction to which each cut curved section 69 contacts the outer diameter surface of the rotary shaft 51.

Referring to FIG. 6, though the one-way clutch members 81a and 81b are composed of various shapes, each one-way clutch member according to the present embodiment comprises a cylindrical shaped outer wheel 83; a plurality of bearing members 87 having an axis in parallel with the rotary shaft 51 in the outer wheel 83, and placed around the circumference; and the one-way clutch members 81a and 81b having a bearing housing 89 for supporting the bearing member 87.

In the bearing housing 89, an opening is formed for projecting the bearing member 87. In the inner diameter surface of the outer wheel 83, a concave guiding surface 93 is formed which extends from a supporting position in which the bearing member 87 is withdrawn from the opening of the bearing housing 89 so as to rotate and support the rotary shaft 51, and a restricting position in which a part of the bearing member 87 is inwardly projected toward the outside of the opening of the bearing housing 89.

Reviewing the operation of the one-way clutch members 81a and 81b, if the bearing member 87 is positioned on the supporting position as shown in FIG. 6, the outer wheel 83 or the rotary shaft 51 enables the relative rotation. If the bearing member 87 is positioned on the restricting position, which is a little bit moved to the right side from the position in FIG. 6, the outer wheel 83 and the rotary shaft 51 are so restrained as to rotate or stop in unity.

When assembled, first, the rotary shaft 51 is contained and coupled in the rotary resistant member 68a, 68b, 68c and 68d. The rotary resistant members 68a, 68b, 68c and 68d are pressurized and inserted to the containing hole 62 in a state of which the cut curved section 69 of the rotary resistant members 68a, 68b, 68c and 68d is placed toward the recess section 63 of the rotary member 61. Next, each washer 71a and 71b is coupled to both ends of the rotary member 61 and the corresponding one-way clutch members 81a and 81b are respectively coupled to the clutch containing section 56 of each clutch housing 53a and 53b. Bushings 73a and 73b are respectively coupled to the inside of the containing hole 56 of the clutch containing section 56 from the rotary member 61 and each one-way clutch member 81a and 81b is coupled to each end of the rotary shaft 51. Then, each clutch housing 53a and 53b is screw-fastened to the coupling hole 17 of the supporting frame 15 by interposing the reinforcing piece 42.

When the slant controller 50 is fastened to the supporting frame 15, the front casing 21 coupled to the front side of the video display unit 10 and the rear casing 31 are coupled each other. At this time, the rotary member 61 and the clutch containing section 56 of the slant controller 50 are in the projected states by passing through the penetrating holes 36 and 33 formed in the lower portion of the rear shielding plate 35 and the rear casing 31. The cap member 43 is coupled to the rotary member 61 and the clutch containing section 56, and the coupling section 64 of the rotary member 61 and the leg member 40 are fastened to each other by the screw 46.

Figure 7:
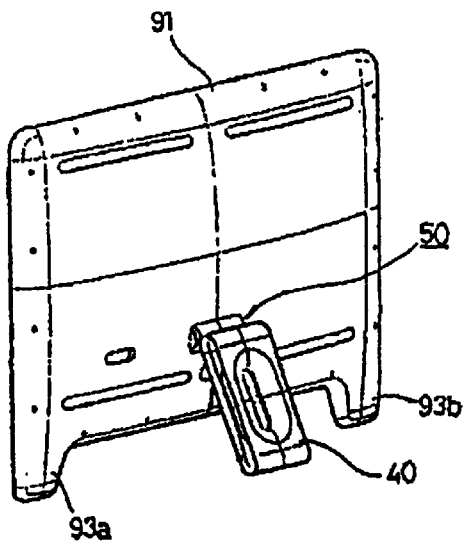
FIG. 7 is a rear-side perspective showing a coupled state of the flat-type monitor shown in FIG. 1.
Figure 8:
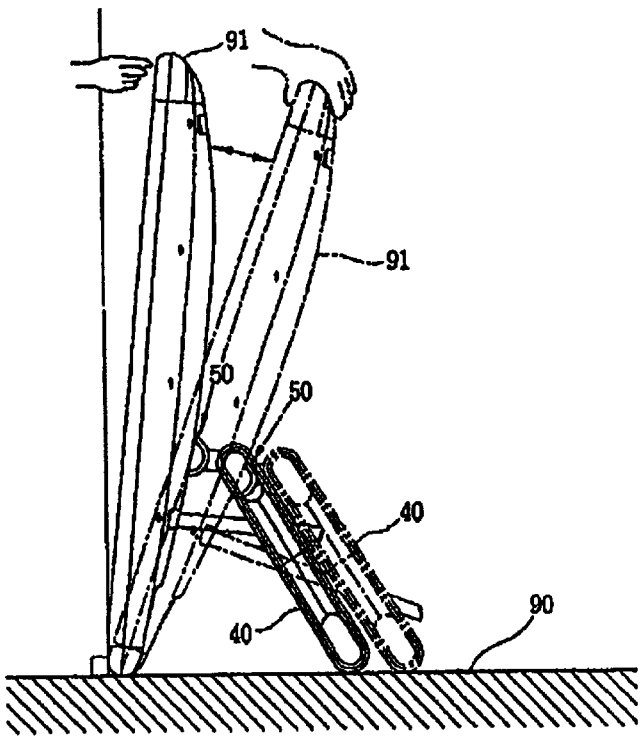
FIG. 8 is a view illustrating a slant controlling operation of the flat-type monitor shown in FIG. 7.

FIG. 7 is a rear-side perspective view showing a coupled state of the flat-type monitor shown in FIG. 1. FIG. 8 is a view illustrating a slant controlling operation of the flat-type monitory shown in FIG. 7. Referring to the drawings, an end of the leg member 40 contacts the installing flat surface and slantingly supports an assembly 91 of the video display unit 10, the front casing and the rear casing in cooperating each other with fixing legs 93a and 93b formed on both lower ends of the front casing 21 and the rear casing 31 to the installing flat surface 90.

When enlarging the slant angle of the assembly to the installing flat surface, a user pulls the top of the assembly 91 to a front side by hand. Then, the rotating force to rotate downward about the rotary shaft 51 is generated in the rotary member 61 coupled with the leg member by its own weight of the leg member 40. At this time, the one-way clutch members 81a and 81b coupled to both ends of the rotary shaft 51 rotationally support the rotary shaft 51 so that the leg member 40 can smoothly rotate downward. Thereby, the leg member 40 supports the assembly 91 in an enlarged state of the slant angle of the assembly 91 to the installing flat surface 90.

Next, when decreasing the slant angle of the assembly 91 to the installing flat surface 90, the upper part of the assembly 91 is pressurized toward the rear side. Then, the rotating force is applied to the leg member 40 in the direction of parting from the assembly 91 about the rotary shaft 51. At this time, the one-way clutch members 81a and 81b generate restraining force to restrict the rotation of the rotary shaft 51. The restraining force is comparatively larger than the friction generated between the rotary shaft 51 and the rotary resistant members 68a, 68b, 68c and 68d so that the rotary shaft 51 is stopped, and the slant angle of the assembly 91 to the installing flat surface 90 becomes small by rotating the one-way clutch members 81a and 81b to the direction of parting from the assembly 91 about the rotary shaft 51.

In the embodiment as described and shown, the rotary member of the slant controller and the leg member are separately formed and coupled to each other, but the rotary member is formed as a unit on an end of the leg member.

Also, the friction between the rotary shaft and the rotary resistant member, and the controlling range of the slant angle of the video display screen to the installing flat surface can be determined by the demand without being limited to that described above.

As described above, the present invention is provided for a flat monitor to promote the user's convenience due to the easy control of the slant angle of the video display screen to the installing flat surface.

While the present invention has been described herein with reference to particular embodiments thereof, a degree of modification, various changes and substitutions are intended in the foregoing disclosure, and in some instances some features of the invention will be employed without a corresponding use of other features without departing from the scope of the invention as set forth.

What is claimed is:

1. A flat-type monitor including a flat video display unit having an video display screen, casings for containing and supporting the video display unit to expose the video display screen, and a slant controller for controlling a slant angle of an assembly of the video display unit and the casings corresponding to external force affecting on the assembly, wherein the slant controller comprises:
    a rotary shaft arranged in parallel to an installing flat surface for a monitor;
    a rotary member having containing holes to axially contain the rotary shaft and being coupled to a leg member installed on a rear side of the assembly to support the assembly to the installing flat surface;
    a rotary resistant member interposed between the rotary member and the rotary shaft to contact each other for adding resistance to the rotation of the rotary member relative to the rotary shaft; and
    a plurality of one-way clutch members arranged on at least one end for allowing the rotation of the rotary shaft toward a direction to which the leg member approaches to the assembly and for restraining the rotation of the rotary shaft toward a direction to which the leg member is parted from the assembly.

2. The flat-type monitor of claim 1, the slant controller further comprising clutch housings to contain and support the one-way clutch members.

3. The flat-type monitor of claim 1, the slant controller further comprising rotation limiting means for limiting the range of the rotation of the leg member.

4. The flat-type monitor of claim 3, the rotation limiting means comprises at least one protrusion vertically extended to the rotary member, and an engaging step fixedly placed on a front side of the rotating direction of the protrusion for restraining the rotation of the protrusion.

5. The flat-type monitor of claim 1, the rotary resistant member has a cylindrical body having a cut curved section projected radially on an end, and a containing section to contain the cut curved section is formed in the rotary member.

6. The flat-type monitor of claim 5, wherein the rotary resistant member is a plate spring member.

7. The flat-type monitor of claim 1, wherein the rotary resistant member rotates in unity with the rotary shaft by adding resistance to the rotation of the rotary shaft when the leg member rotates toward a direction of approaching the assembly, and the rotary resistant member rotates relative to the rotary shaft in a state of elastically contacting the rotary shaft when the leg member rotates toward a direction of being parted from the assembly.

8. The flat-type monitor of claim 1, wherein the rotary member includes a coupling section on its outer surface, the coupling section vertically protruded so as to fixedly couple an end of the leg member.

9. The flat-type monitor of claim 1, wherein the leg member is formed as a unit with the rotary member of the slant controller.

* * * * *